United States Patent
Valls et al.

[11] Patent Number: 5,979,695
[45] Date of Patent: *Nov. 9, 1999

[54] ICE CREAM SUPPORT CONTAINERS

[76] Inventors: Arcadio Martinez Valls; Juan Garcia Benau; Rocio Cabedo Trigueros; Rosa Maria Bolos Perez, all of Chelva, 14, 46-18 Valencia, Spain

[ * ] Notice: This patent issued on a continued prosecution application filed under 37 CFR 1.53(d), and is subject to the twenty year patent term provisions of 35 U.S.C. 154(a)(2).

[21] Appl. No.: 08/586,883

[22] PCT Filed: May 18, 1995

[86] PCT No.: PCT/ES95/00059

§ 371 Date: Oct. 16, 1996

§ 102(e) Date: Oct. 16, 1996

[87] PCT Pub. No.: WO95/31385

PCT Pub. Date: Nov. 23, 1995

[30] Foreign Application Priority Data

May 18, 1994 [ES] Spain ................................. 9401095

[51] Int. Cl.⁶ .................... B65D 3/06; A23G 9/26
[52] U.S. Cl. .................... 220/666; 220/671; 426/137; 426/139; 426/134
[58] Field of Search .................... 220/737, 606, 220/671–674; 229/932; 426/137, 139, 134

[56] References Cited

U.S. PATENT DOCUMENTS

| | | | |
|---|---|---|---|
| 1,202,761 | 10/1916 | Crabtree | 220/666 |
| 1,638,480 | 8/1927 | Feybusch | 220/737 |
| 1,672,884 | 6/1928 | Gingras | 229/932 |
| 1,794,238 | 2/1931 | McKibben | 426/139 |
| 1,800,759 | 4/1931 | Shean | 229/932 |
| 2,162,224 | 6/1939 | Legge | 229/932 |
| 2,228,942 | 1/1941 | Balton | 426/139 |
| 2,362,595 | 11/1944 | Torrison | 220/737 |
| 3,083,877 | 4/1963 | Gash | 220/666 |
| 3,939,888 | 2/1976 | Scarnato | 220/666 |
| 4,226,355 | 10/1980 | Helfrich, Jr. | 229/932 |
| 4,639,376 | 1/1987 | Saladino et al. | 426/134 |

FOREIGN PATENT DOCUMENTS

| | | |
|---|---|---|
| 232235 | 7/1978 | Spain . |
| 267888 | 7/1983 | Spain . |
| 289815 | 3/1986 | Spain . |
| 289925 | 4/1986 | Spain . |
| 1009860 | 11/1989 | Spain . |

Primary Examiner—Joseph M. Moy
Attorney, Agent, or Firm—Klauber & Jackson

[57] ABSTRACT

The container has a substantially conical body (1) and a mouth or cup of larger-diameter (5). It may be provided with grooves (3), a closure cap (10), ribs or notches (7) for a better coupling of the cornet (8), an orifice for holding the spoon, truncation (2) and/or corrugation of the conical body, as well as various geometrical configurations. A plurality of systems for rising the cornet as well as means for holding complementary serviettes and wafers. The container also includes a system for channeling the ice-cream dripping. It applies to ice-cream cornets. It offers an new presentation of a consumption product, giving it a better look and attraction for the consumer with regards to the shape, color and size, causing a new sensation and commodity to the consumer when eating the ice-cream. It also contributes to better salubrity, hygiene and cleanliness when manipulating and consuming the products. It avoids the dripping of the ice-cream which stains and spots any part of the consumer body, the garments, and the environment. Finally, it has all the advantages of being a container, and for all these reasons it is an improvements of the industrial quality concept.

10 Claims, 8 Drawing Sheets

ICE CREAM SUPPORT CONTAINERS

OBJECT OF THE INVENTION

The present invention, as expressed in the title of this specification, refers to an ice cream support container, which offers a way of holding ice cream, preferably of the cone type, during consumption, in such a way that the perimeter of the cone is completely covered.

The objectives are:

To contribute to better health and hygiene, by avoiding direct handling of a food product with the hands.

To facilitate cleanliness throughout handling, by prevent melting ice cream from dripping on any part of the body, clothing, surrounding area or environment.

To make product consumption easier.

To offer a new presentation of a consumer product.

To give a final touch to the ice cream product.

To attract consumers' attention to the shape, color and/or size.

To offer new sensations when tasting ice cream.

To bring together all the advantages of being a container (for example for transportation, conservation, protections against bumps, etc.), taking up very little space because the product is stackable.

To improve the concept of industrial quality.

As a complement of the main object of the invention, the possibility of adding a wafer which, with the help of the support, by way of ridges and grooves, will result in a better grip of the cone is offered.

The support and the wafer may present different options which will be described hereinafter.

BACKGROUND OF THE INVENTION

A well known way to eat ice cream is in a cone, which is eaten right away, usually out on the street, holding the wafer of the cone with the hands. Obviously, this can become very uncomfortable for the consumer, since the melting ice cream starts dripping and can easily drip on the person handling or consuming it, or on the surroundings. All this presents a series of sanitary disadvantages, (hygiene, cleaniness and comfort) in the whole process of serving and consuming the product.

Until now, no device or invention has been found to solve these problems satisfactorily.

DESCRIPTION OF THE INVENTION

In order to achieve these objectives and avoid the drawbacks mentioned above, the invention consists of an ice cream support container. In the description of this object several parts can be distinguished: a near-conical body, slightly inclined with respect to the vertical, closed at the narrowest end—which will be called hereinafter the body or base—and connected at its widest part to a truncated cone mouth of larger diameter and less height than the previous body—hereinafter called the mouth or lip, the object described being made preferably of plastic material.

The ice cream cone to be eaten is placed in the central cavity of the cited near-conical body, so that the area of wider diameter or mouth catches the ice cream as it melts, thus achieving the above mentioned purposes and consequent advantages.

The ice cream support container presents the following options:

1) Cover. The design of the mouth provides the possibility of adapting over it a lid that fits the perimetric ledge, so that the container can be used to keep or sell ice cream already prepared, such as that sold currently in carton containers.

2) Grip system. On the inside of the upper end of the base there are ridges or grooves that, with the help of the cone or wafer, improve its grip.

3) Breaking sytem. Also provided for are weakening or perforated lines, arranged lengthwide or crosswise, or breaking the container and extracting the rest of the ice cream cone left inside once most of the ice cream has been eater.

4) Securing the spoon. On a part of the outer edge of the mouth or lip, an orifice or tab can be placed to hold a spoon.

5) Truncation of the body. The body of the container can be truncated with a closed bottom.

6) Corrugation of the body. The body of the container or support can present a corrugated surface in part, for better grip.

7) Different shapes. The shape of the container support can adapt different geometric variations.

A special option in this section would be that the container support could take the shape of a little cup for ice cream with a mouth or lip.

Also anticipated in the use of wafers with specific shapes that adapt to the structure of the container.

Consequently, the complementary wafer will be offered with the same shape or similar to that of the main support container, and will present comparable options, such as the above-mentioned grip system, the truncation of the body and the different geometric shape.

A specific option of the complementary wafer is its presentation without a mouth or lip and truncated on the bottom base.

The container of the invention can be used in ice cream shops as a complement to the ice cream, when the users acquire the product, enabling them to use the container to hold their ice cream cone or wafer.

On the other hand, the design offers support containers that incorporate systems for elevating the edible ice cream cone, facilitating in this way hygienic extraction, for consumption of the cone as well as the ice cream. These systems can be used for both the whole wafrer and the truncated cone.

Among the elevation systems, pressure, coil and pump systems can be distinguished.

In the pressure systems there are three varities:

BY THE BELLOWS EFFECT.

In this case, pressure is applied from the bottom end of the base upwards, producing the pleating of the plastic of the support due to its bellows, or according pleast.

BY SOFT CONSISTENCY OF THE MATERIAL.

In this case, pressure is also applied from bottom of the base; in this area part of the material, preferably plastic, is of a softer consistency, which causes it to deform and raise the wafer.

WITH THE BASE DIVIDED INTO SECTIONS.

Pressure is also applied upwards from the bottom of the base. The base is divided into two sections of different thickness, so that the lower part fits in the higher part. The inside of the cylindrical area of the higher part can incorproate several different levels to hold the lower area by the way of ridges or support rungs.

The coil system consists of giving upward or downward winding movement starting from the lower part of the base, which moves the lower part along the threads of the coil in the cylindrical area of the upper part of the base. This mechanism may or may not be combined with the coupling system of the wafer with the support container. The coupling system can also be coiled.

The pump system consists of a pushing movement on the cone by means of a device composed of an outside arm or lever, which actuates the system, cvonnected to an insidfe ring on which the wafer rests, there being a vertical rail for sliding the lever upward or downward which is situated in a cylindrical area of the base or support.

Also provided for in the desitgn is that the support containers have, on the back or reverse side of the wing or lip, a clip, orifice or eye to place and hold a napkin.

Another characteristic of the invention of the ice cream support containers lies in the small casting or notches on the side of the wing or lip. These notches enable the attachment of a complementary wafer which lend an additional trimming to the ice cream, while giving support to more voluminous shapes of ice cream.

Another novel characteristic of these supports is the system that channels melting ice cream dripping on the wing or lip. This channeling system consists of equipping the container with a drain borne in the lower part of the mouth which is extended by means of a double wall over the base. Said channeling system is useful for protecting the ice cream cone or wafer from moisture.

Hereinafter to provide a better understanding of this specification and forming an integral part of the same are a series of figures in which the object of the invention has been represented in an illustrative and non-restrictive manner.

DESCRIPTION OF ONE OR SEVERAL EMBODIMENTS OF THE INVENTION

Hereinafeter is a description of several embodiments of the invention, making reference to the numbering used in the figures.

Thus, the ice cream support shown in FIG. 21 is equipped with an inverted near-conical body (1) with a smaller or lower closed base (2), the central part slightly corrugated, with a mouth or larger base (4) extended by way of a lip (5), which has, in the present case, an inverted truncated cone shape.

The conical body (1) presents, in this embodiment, some weakening lines (6) that allow breaking the container, although generally it may lack these lines (6).

Figure 1:
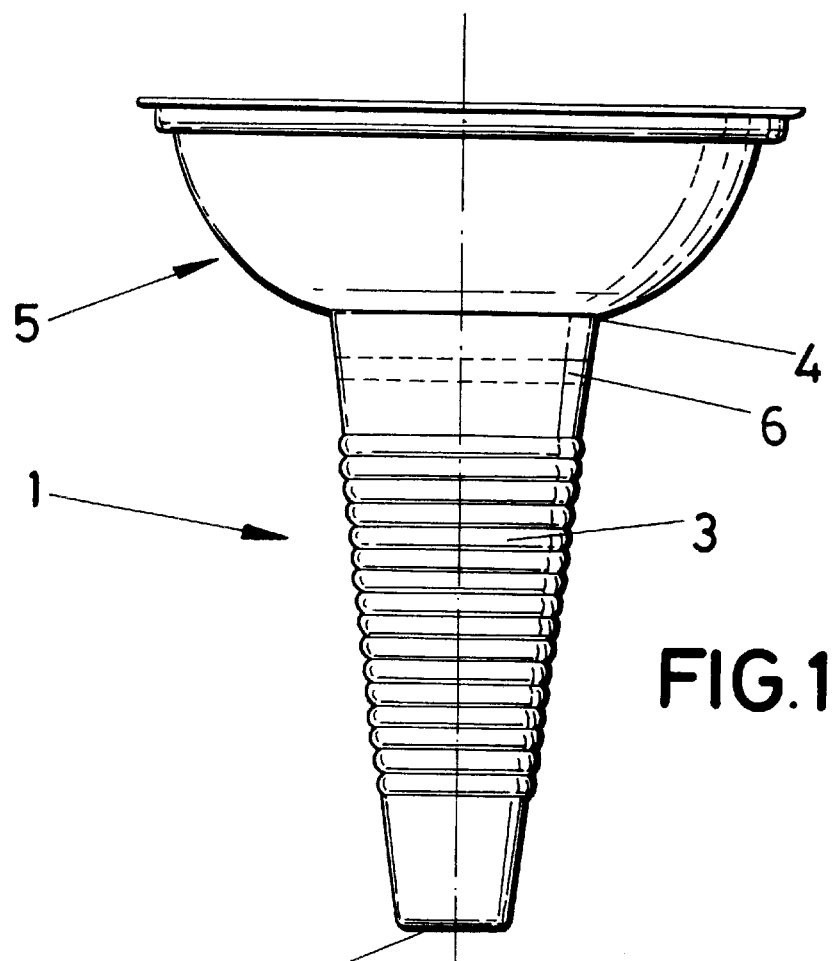
FIG. 1 shows a raised view of the ice cream support object of this invention.
Figure 2:
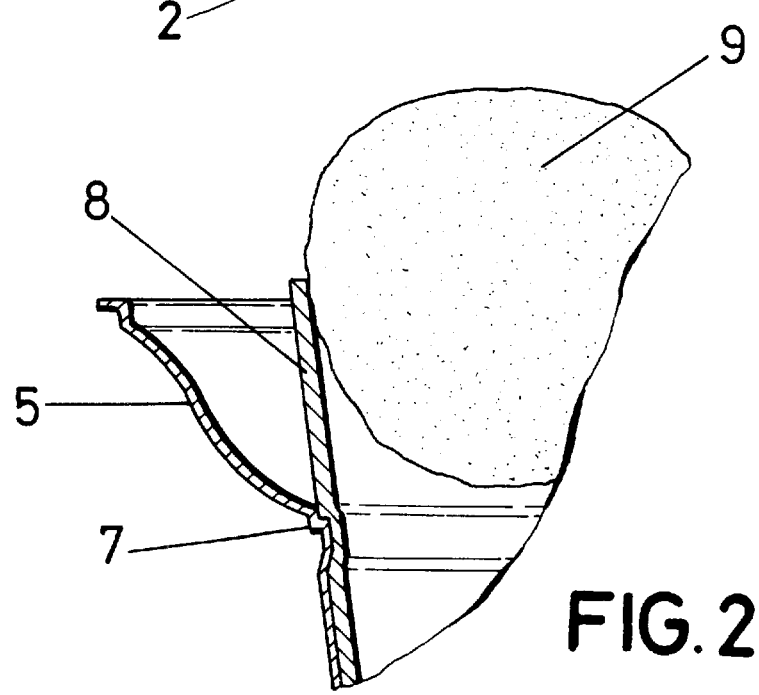
FIG. 2 shows a partially sectioned view of an ice cream support container according to the present invention, also showing the corresponding wafer and ice cream.

Also provided for in the design is a rung (7) in the mouth (5) which will allow fitting in the wafter (8). As seen in FIG. 2. FIG. 2 shows a portion of ice cream (9) so as to appreciate the fact that the melting ice cream (9) would drip into the mouth of the support (5), thus avoiding dripping on the consumer.

Figure 3:
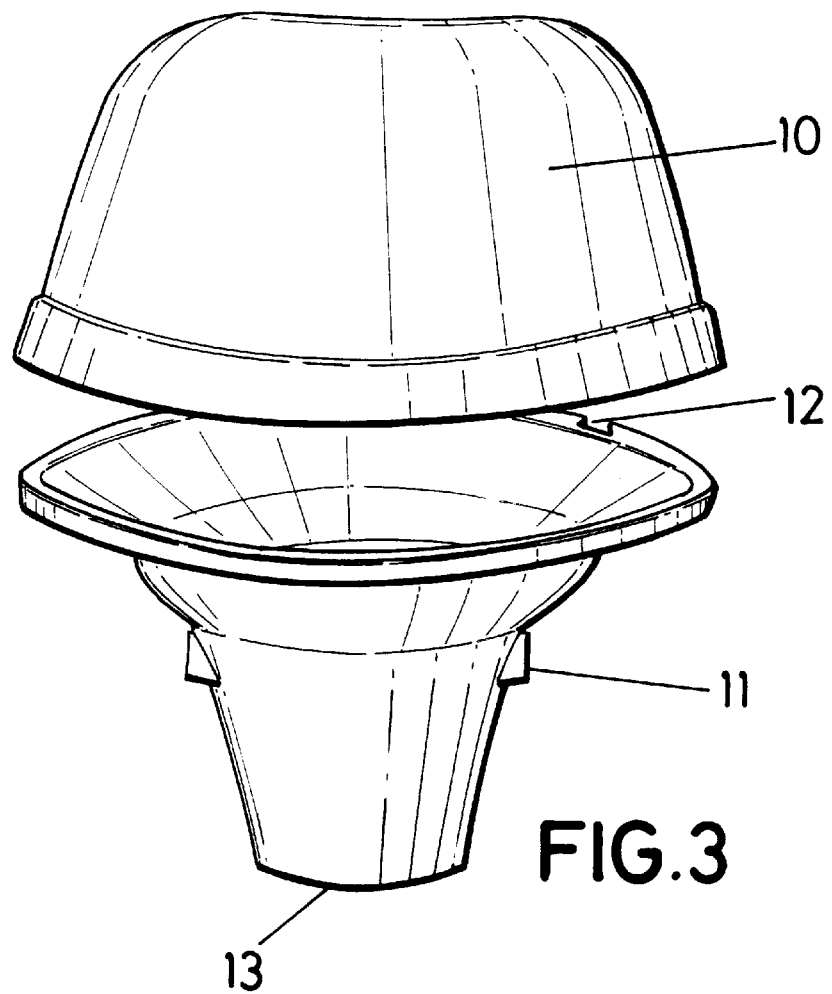
FIG. 3 shows a perspective view of another ice cream support container, according to the present invention, showing in this case a fitted lid.
Figure 4:
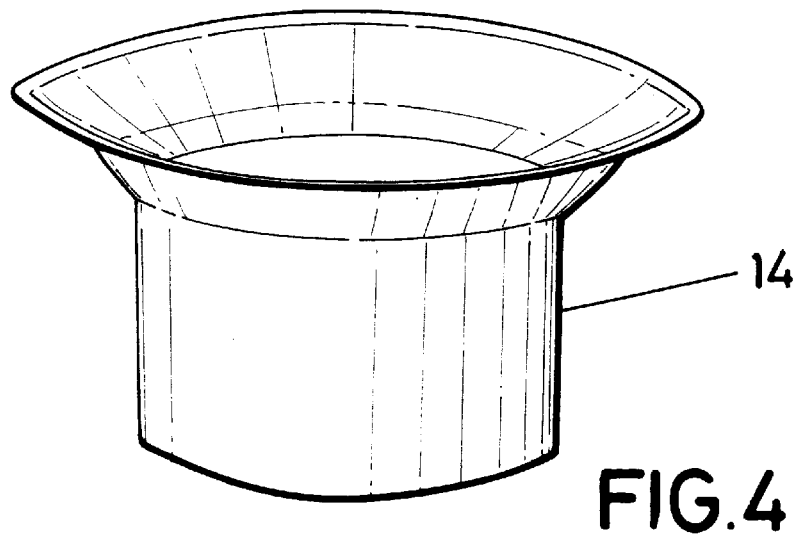
FIG. 4 represents a perspective view of a version of the ice cream support of the present invention.

The invention also provides for the use of a cover (10) to close the container, as shown in FIG. 3. Said embodiment also incorporates ridges or internal grooves (11) which adapt to the notches (17) on the corresponding wafer (16) and shown in FIG. 6. In addition, the embodiment of FIG. 3 shows an opening (12) in the mouth that will hold a small spoon. On the other hand, the main body has a wider bottom part (13) to facilitate its standing on a surface. In this sense, said main body can also be cylindrical (14), as shown in FIG. 4.

Figure 5:
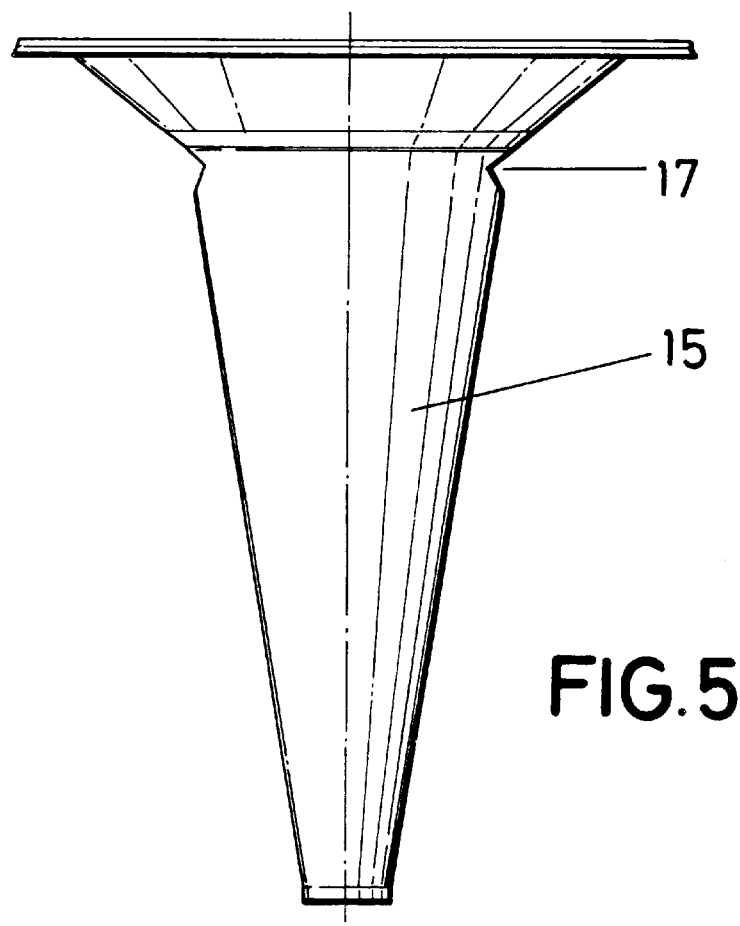
FIGS. 5 to 9 show views of the wafers especially adapted to the ice cream support containers of the invention.
Figure 6:
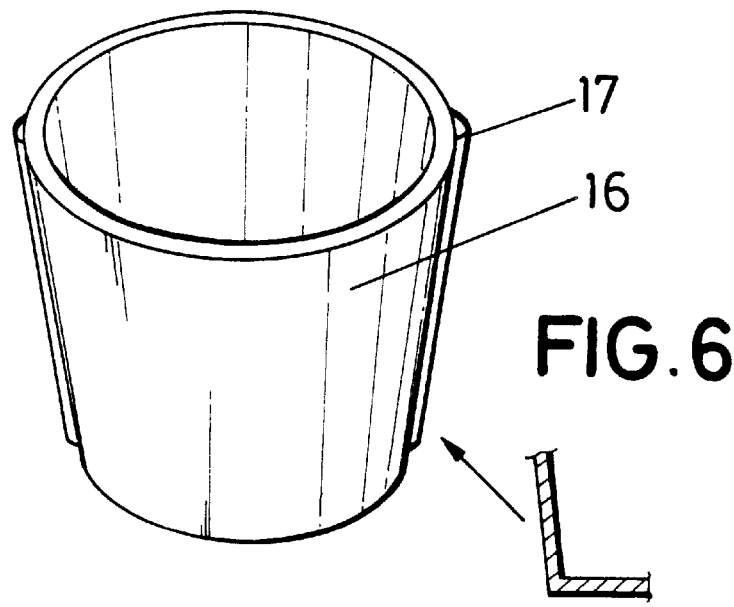

FIGS. 5 and 6 show wafers that are especially adapted to the containers of the invention. The notches (17) on the wafer (15) in FIG. 5 are recesses that adapt to the rungs (7) of the container shown in FIG. 2; while in wafer (16) of FIG. 6 said areas (17) are ribs that adapt to the ridges (11) of the container of FIG. 3.

Figure 7:
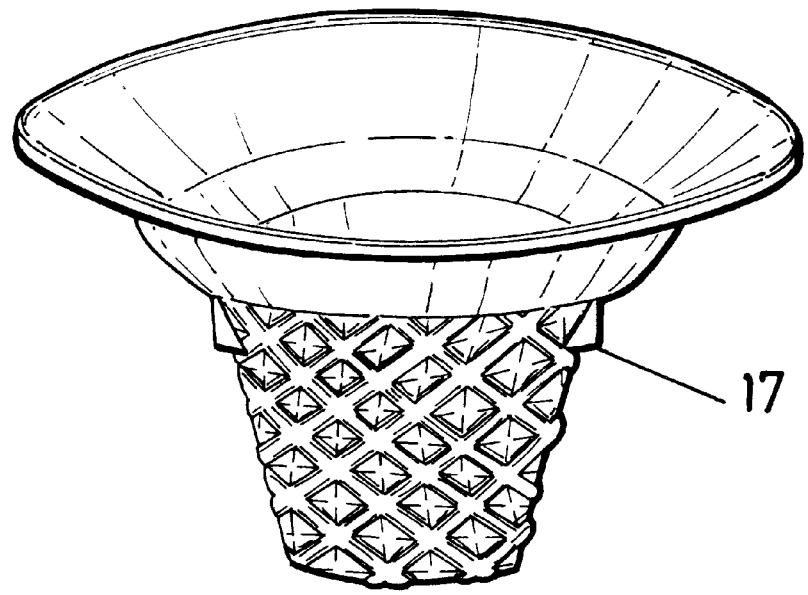
Figure 8:
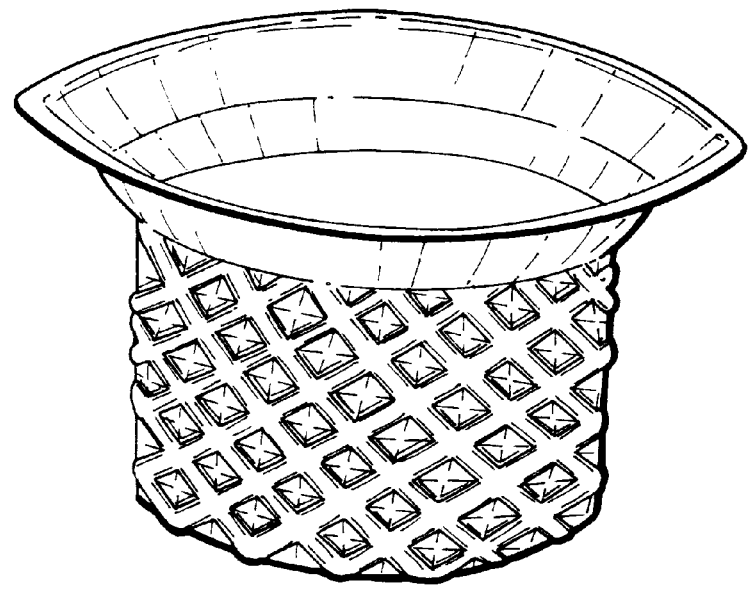
Figure 9:
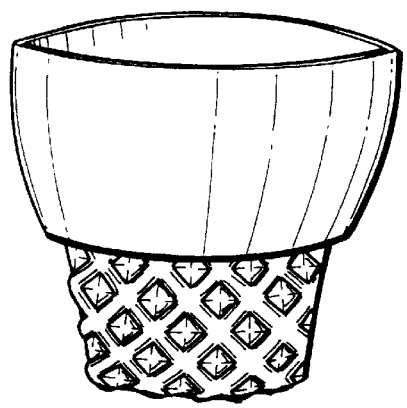

Other embodiments of wafers especially adapted to the containers of the invention are shown in FIGS. 7, 8 and 9, although conventional wafers may also be used.

Figure 10:
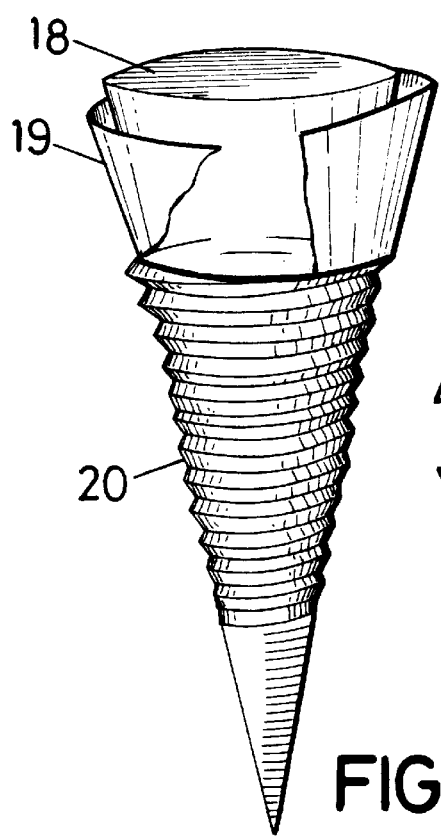
FIG. 10 shows a perspective view of an ice cream support container according to the invention and which incorporates wafer elevation by the bellows, or accordion-pleat system.

FIGS. 10 anbd 15 shows support containers with different ways of elevating the inside wafer (18) without it being touched by the consumer.

Thus, the support container (19 in in FIG. 10 containers a pleated (bellows) section (20), so that when compressing the section (20), the wafer comes out more.

Figure 11:
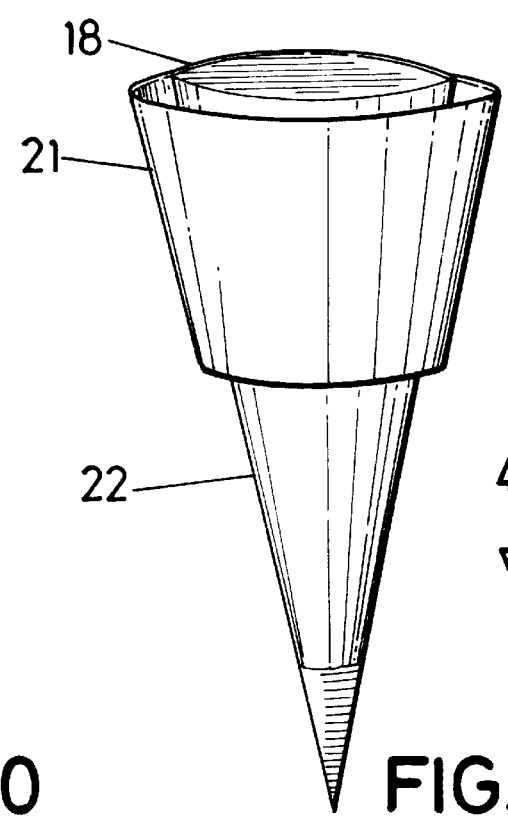
FIG. 11 shows a perspective view of an ice cream support container according to the invention which incorporates wafer elevation by the soft consistency of a segment of the support.

The oiption in FIG. 11 has an identical application, but in this case, the support container (21) includes a weaker section (22) which deforms when pressed, producing the same effect, the relative elevation of the wafer (18).

Figure 12:
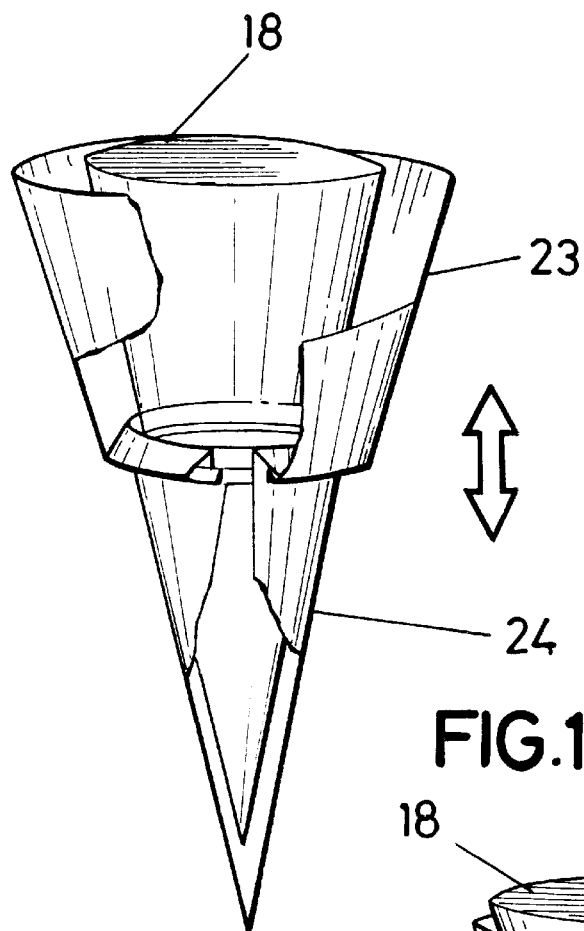
FIG. 12 shows a perspective view of an ice cream support container according to the invention which incorporates wafer elevation by introducing the lower part of the support into the upper part.
Figure 13:
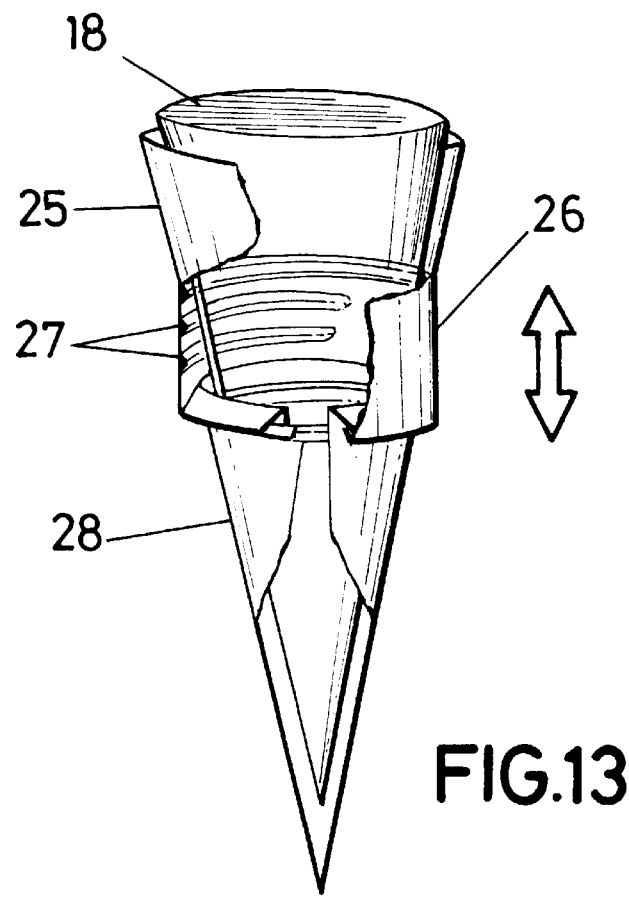
FIG. 13 shows a perspective view of an ice cream support container according to the invention which incorporates a wafer elevation system similar to the preceding FIG. 12, although with the upper part of the container including internal ridges that allow setting the elevation at different heights.

The solution in FIG. 12 is to equip the support container with an upper part (23) and a thinner bottom part (24), so that when pressed upwards, the bottonm part (24) is inserted in the upper part (25), shortening the container so that most of the wafer (18) comes out. In FIG. 13 the system is similar, but here the top part (25) of the container includes in its lower part a cylindrical segment (26) with internal perimetric ridges (27) that allow graduating and fixing the level of insertion of the lower part (28).

Figure 14:
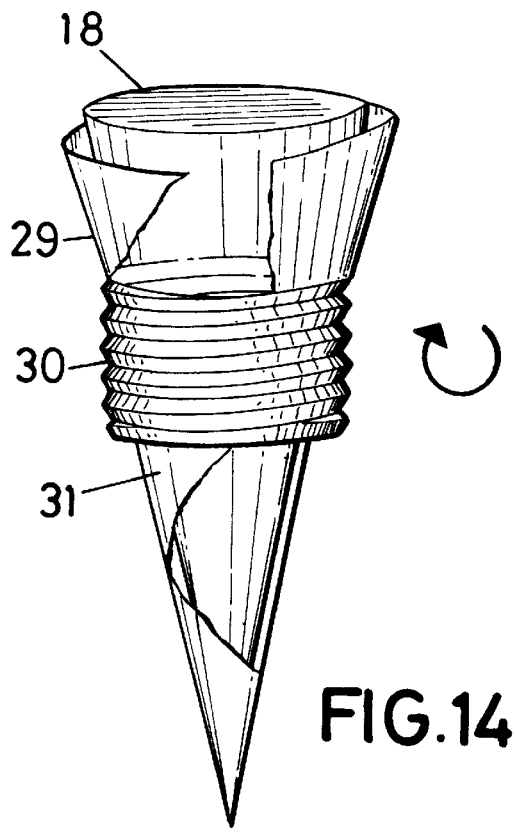
FIG. 14 shows a perspective view of an ice cream support container according to the invention which incorporates wafer elevation by way of a coil between the upper and lower parts opf the container.

In FIG. 14 the container presents an upper part (29) with a lower coiled segment (30), so that the bottom part (31) of the container screws in with a twist, which produces the shortening of the container and wafer elevation (18). In this case, the wafer (18) may be conventional or incorporate a coil that complements said segment (30).

Figure 15:
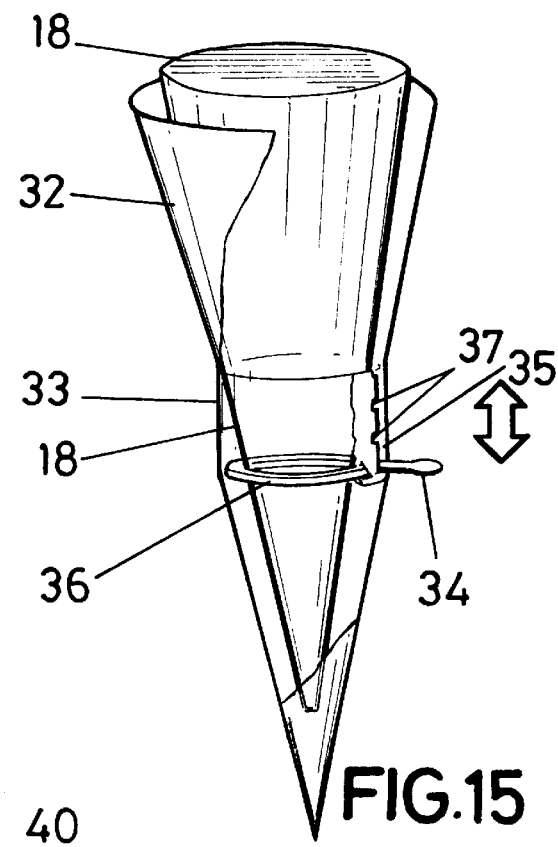
FIG. 15 shows a perspective view of an ice cream support container according to the invention which incorporates wafter elevation by means of a pump.

FIG. 15 shows a pump system for wafer elevation (18). In this case, the support container 32) presents a central section (33) which incorporates a device consisting of an arm or lever (34) that comes out through a vertical groove (35) of the centeral section (33). The pump (34) connects to a ring piece (36) that stays inside the container (32) and gives support to the wafer (18), in such a way that, when the lever (34) is elevated, the wafer (18) is also elevated. To fix the elevation of the lever (34) the groove (35) has several cross notchesd or fixing points. (37).

Figure 16:
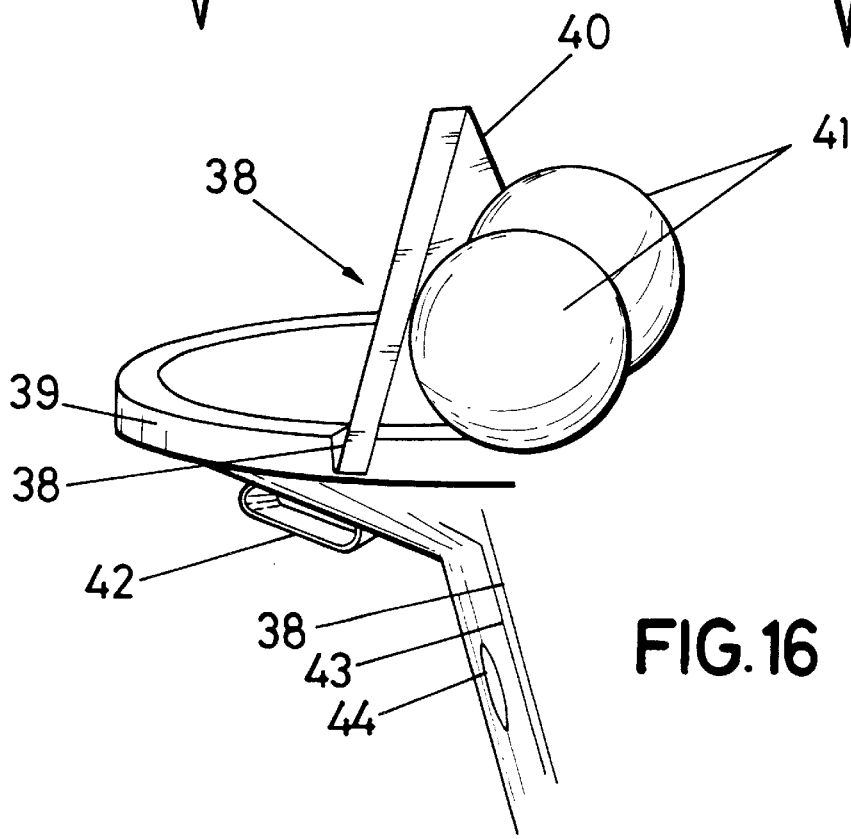
FIG. 16 partially shows a perspective view of an ice cream support container, according to the present invention, which displays the notches for attaching a complementary wafer, the pin for holding a napkin and the channeling system for melting ice cream.
Figure 17:
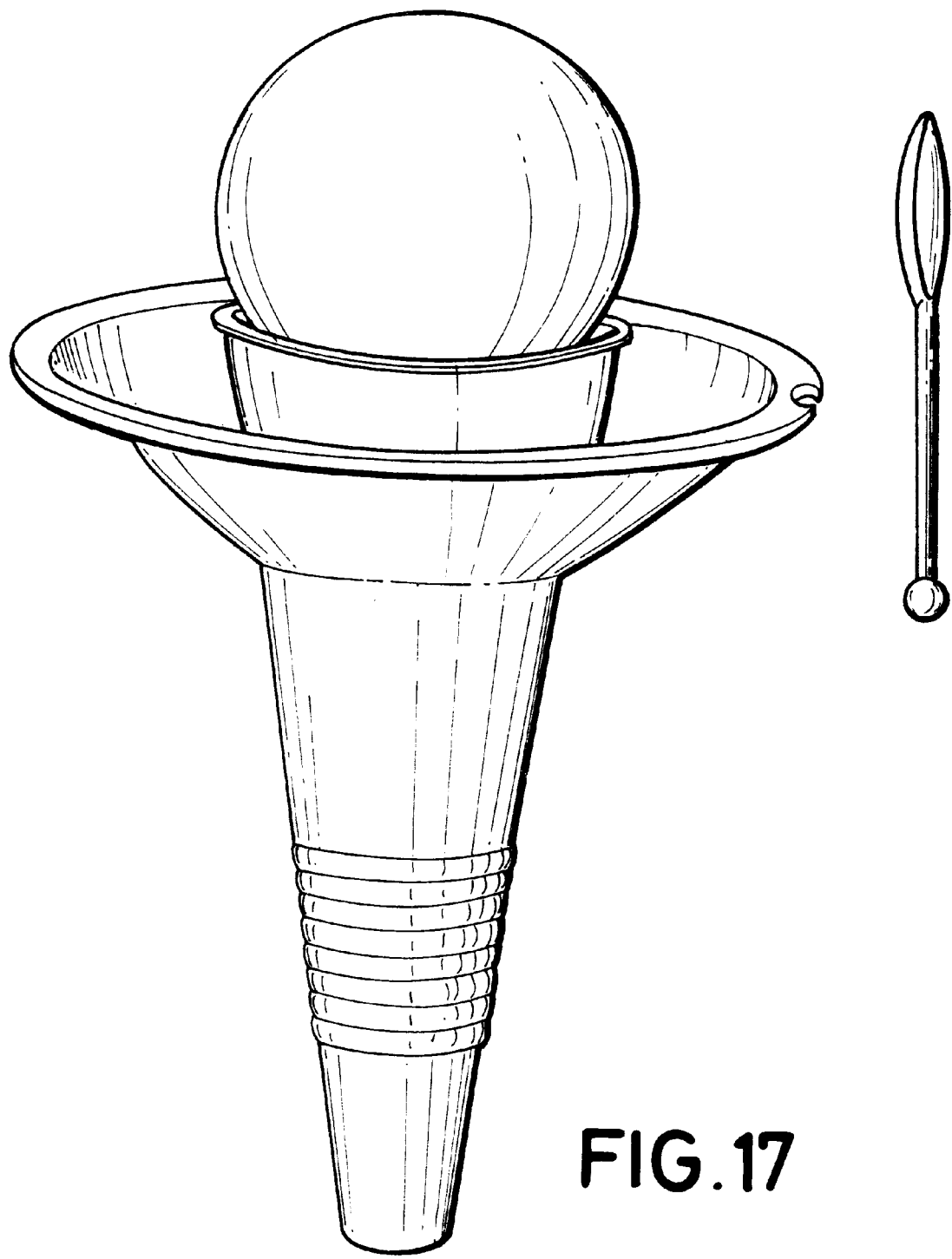
FIG. 17 shows a perspective view of an ice cream cone fitted in one of the support containers of the present invention, which includes a holder for a small spoon.

The support containers of the invention include other novelties as shown in FIG. 16. One of them consists of including several notches (38) on the outer edges of the wing or lip (39) of the container, which allows attaching a complementary wafer (40) which may be used as a trimming or to hold the ice cream (41).

Another novelty is that it introduces a kind of ring or pin (42) on the underside of the wing or lip (39) for attaching a napkin.

Finnally, included in FIG. 16 is the possibility of channeling the dripping ice cream by means of the double wall (43) of the container, in such a way that the melting ice cream (44) drops to the bottom without touching the conventional wafer so that it does not become moist and soggy.

We claim:

1. Ice cream support container for an ice cream including a wafer, comprising a lower portion including means for gripping the wafer and an upper portion, substantially as a truncated cone, said upper portion having a larger diameter than said lower portion, wherein the lower portion is axially displaceable with regard to said upper portion, and wherein the container comprises a bellows portion that is axially compressible, thus allowing the lower portion to be axially displaceable with regard to the upper portion.

2. Ice cream support container, according to claim 1, characterized in that said bellows is a corrugated section of a pleated type that is compressible in its axial direction.

3. Ice cream support container, according to claim 1, characterized in that it includes a rung, projections or notches (7, 11) that aid in fixing the wafer or cone (8).

4. Ice cream support container, according to claim 1, characterized in that it includes an orifice (12) in one section of said wide part (4) to hold a small spoon.

5. Ice cream support container, according to claim 1, characterized in that it includes a perimetric wing (39) in its mouth that is provided with some notches (38) that enable attachment of a complementary wafer (40) which provides additional support for the ice cream (41).

6. Ice cream support container, according to claim 1, characterized in that said top wide part includes a ring or clamp (42) that allows attachment of a napkin.

7. Ice cream support container, according to claim 1, characterized in that it can have different geometric variations that allow attachment of wafers or cookies of shapes adapted geometrically to said container or with conventional shapes.

8. Ice cream support container, according to claim 1, characterized in that the body of the support container is truncated and its bottom part (13) is closed.

9. Ice cream support container, according to claim 1, characterized in that said bellows portion includes some corrugations (3).

10. Ice cream support container, according to claim 1, characterized in that the body of the support container is cylindrical (14) with its bottom part closed.

* * * * *